United States Patent [19]

Collins et al.

[11] Patent Number: 5,417,888

[45] Date of Patent: May 23, 1995

[54] TANNIN EXTRACTION AND PROCESSING

[75] Inventors: Peter J. Collins; Yoshikazu Yazaki, both of Victoria, Australia

[73] Assignee: Commonwealth Scientific and Industrial Research, Melbourne, Australia

[21] Appl. No.: 185,288

[22] Filed: Jan. 24, 1994

Related U.S. Application Data

[63] Continuation of Ser. No. 888,361, Jan. 22, 1991, abandoned, which is a continuation of Ser. No. 154,708, Feb. 11, 1988, abandoned.

[51] Int. Cl.$^6$ .................. A61K 35/78; C07G 17/00
[52] U.S. Cl. .................. 252/399; 252/398; 252/404; 252/406; 44/307; 156/335; 514/783; 527/400
[58] Field of Search .................. 156/335; 428/529; 252/1, 398, 399, 400.1, 404, 406; 514/783; 44/307; 527/400

[56] References Cited

U.S. PATENT DOCUMENTS

4,521,336  6/1985  Dilling .

FOREIGN PATENT DOCUMENTS

517828  8/1981  Australia .
518703  10/1981  Australia .
533791  8/1983  Australia .
181274  6/1976  New Zealand .

OTHER PUBLICATIONS

Australian Standard, entitled "Adhesives For Timber And Timber Products Part 1 Adhesives For Plywood Manufacture" AS 2754.1-1985, pp. 1-7.

Stamdards Association Of Australia, entitled "Australian Standard Methods Of Test For Veneer And Plywood" AS 2098.2-1977, pp. 2-1 thru 2-8.

A. Journal-article entitled "Investigations On The Tannins OF Pinus Radiata Bark" by H. Anderson and A. Bilkens-1985, pp. 183-191.

*Primary Examiner*—Gary Geist
*Assistant Examiner*—Valerie Fee
*Attorney, Agent, or Firm*—Sughrue, Mion, Zinn, Macpeak & Seas

[57] ABSTRACT

A method for producing a relatively low viscosity tannin extract from bark and/or wood and suitable for use in formaldehyde-condensation adhesives comprises providing tannin extract obtained from bark and/or wood, separating from the tannin extract the high molecular weight material, subjecting the high molecular weight material to treatment with one or more sulphite compounds to reduce the molecular weight and recombining the sulphited material with the tannin extract. The tannin extract may be recovered by subjecting bark and/or wood to a first stage hot aqueous tannin extraction process, thereby obtaining a first stage tannin extract, subjecting the extracted bark and/or wood to a second stage hot aqueous extraction process at a higher pH than the first stage, thereby obtaining a second stage tannin extract, and optionally recombining the first and second stage tannin extracts.

26 Claims, No Drawings

TANNIN EXTRACTION AND PROCESSING

This is a Continuation of application Ser. No. 07/888,361, filed on Jan. 22, 1991, now abandoned, which is a Continuation application of Ser. No. 07/154,708, now abandoned, filed on Feb. 11, 1988.

BACKGROUND OF THE INVENTION

1. Field of the Invention

The present invention relates to tannins (predominantly natural polyphenolics), especially but not only for use in adhesives for wood and other products, and is particularly concerned with methods of processing tannins, including tannin extraction.

2. Description of the Related Arts

The bark and wood extracts of various commercially important trees contain polyphenolics in the form of tannins which can form condensation products with formaldehyde to thereby act as bases for wood adhesives. Such condensation products have been widely studied particularly with a view to obtaining suitable adhesives for plywood and particle-board. These tannin bark and wood extracts are well known in the art and may be obtained, for example, by extraction from comminuted wood and bark in water in which the tannins tend to dissolve. However, the molecular weights of the polyhydroxy phenols may range from $3 \times 10^2$ to $3 \times 10^8$ and difficulties have been encountered primarily due to excessive viscosity of the extracts and the difficulty in obtaining uniformity in product quality.

The lack of uniformity in product quality may arise because sugars and other carbohydrates, as well as other contaminants, may also dissolve in the water while the high molecular weight polyphenolics may not dissolve if the water is cold. The low molecular weight tannin extract may accordingly have a substantial amount of contamination and a low viscosity leading to excessive penetration of the resin into the material being bonded.

There have been various proposals for alleviating these difficulties, the main one of which is to conduct the extraction in hot water, preferably at about 100° C. This increases the solubility in water of the high molecular weight polyphenolics and increases the ratio of polyphenolic material to contaminants such as sugar.

It is important where the tannin is used in adhesives to include the highly viscous extract material in the resin since this contains the higher molecular weight polyphenolics which provide better bonding characteristics of the tannin extract due to their lower contaminant ratio and since excess penetration of the adhesive into the material being bonded may otherwise occur. On the other hand, the tannin extract may become excessively viscous and be difficult to mix and spread.

For example, the yields of tannin from aqueous single stage extraction of one sample of radiata pine (*Pinus radiata*) bark, carried out at 20°, 60° and 100° C., were 2%, 5% and 10% respectively, and viscosities of 40% aqueous solutions of the 20°, 60° and 100° C. aqueous extracts were 300 cP, 800 cP and 5000 cP at 25° C. The yields are accordingly low and the known process is not economically favourable for commercialization. Of more importance, the highest yield product is of poor quality because it is very difficult to formulate adhesives from the 100° C. aqueous extracts; the viscosities of the resultant adhesives are too high for either plywood or particleboard bonding processes. For particleboard manufacture a viscosity of approximately 1500 cP is considered to be maximum and viscosities less than 1200 cP are desirable. It is very difficult to produce such adhesives from the 100° C. tannin extract.

One proposal for reducing the viscosity of the bark and wood extracts has been to treat the extracts with a sulphite compound such as sodium sulphite which tends to cleave the polyphenolic chains and also to sulphonate polyphenolics to produce compounds with greater water solubility. However, we have found that the sulphite reaction is non-selective for the higher molecular weight materials so that the low molecular weight polyphenolics are more readily cleaved. For example, when a sample of 100° C. aqueous extract of radiata pine bark is sulphited (25 parts dried extracts, 1.25 parts sodium metabisulphite, 75 parts water, refluxed for 2 hours) the changes in the percentage of the extract falling within various molecular weight ranges are shown in Table 1.

TABLE 1

| | Molecular size distribution | |
|---|---|---|
| | 100° C. aqueous extracts | |
| Fraction by molecular weight | Unsulphited (%) | Sulphited (%) |
| More than $10^6$ | 22.4 | 19.1 |
| $10^5 \sim 10^6$ | 5.5 | 2.4 |
| $10^4 \sim 10^5$ | 29.2 | 26.0 |
| $10^3 \sim 10^4$ | 11.5 | 1.5 |
| Less than $10^3$ | 31.4 | 51.0 |

It is evident that sulphitation results in a substantial increase in the fraction of lowest molecular weight ($<10^3$) as a result of selective cleavage of the chains in the fractions having molecular weights of up to about $10^6$, whereas the percentage of the fraction having the highest molecular weight is little affected. Adhesives made from such sulphited extracts may spread more readily but are frequently of poor quality because their high content of low molecular weight components leads to excessive penetration of the adhesive into the substrate to be bonded. For example, when total aqueous extracts are sulphited, converted to adhesives and used in the production of plywood the quality of the bonds is only B as described in Australian Standard 2754.1-1985 Adhesives for Timber and Timber Products, Part 1 Adhesives for Plywood Manufacture:- Standards Association of Australia, North Sydney N.S.W., 1985, which calls up Australian Standard 2098.2-1977 Methods of Test for Veneer Plywood:- Bond Quality of Plywood (Chisel Test) Standard Association of Australia, North Sydney, N.S.W., 1977 as the method for assessing quality.

A further proposal for providing relatively low viscosity tannin extracts from bark and wood is made in our Australian patent specification 533791 in which it is suggested that following aqueous extraction of the polyphenolics, any high viscosity material is separated by ultrafiltration and discarded. This process has been found to provide satisfactory extracts for the formulation of adhesives even though the high viscosity extracts have the best bonding characteristics. However, in commerical applications the provision of membranes to achieve the necessary fractionation is costly and the fractionation itself may be difficult to control.

SUMMARY OF THE INVENTION

It is an object of a first aspect of the present invention to satisfactorily reduce the viscosity of wood and/or bark extracts which are suitable for the formulation of adhesives.

According to the present invention there is provided a method for producing a relatively low viscosity tannin extract from bark and/or wood and suitable for use in formaldehyde-condensation adhesives, which method comprises providing a tannin extract obtained from bark and/or wood, separating from the tannin extract the high molecular weight material, subjecting the high molecular weight material to treatment with one or more sulphite compounds to reduce the molecular weight and recombining the sulphited material with the remainder of the tannin extract.

Further according to a first aspect of the present invention there is provided a tannin extract having a relatively low viscosity which is produced by the method proposed in the immediately preceding paragraph.

DESCRIPTION OF THE INVENTION

By the first aspect of the present invention the high molecular weight material is cleaved and therefore its viscosity reduced without reducing the viscosity of the lower molecular weight material and the sulphited material is recombined with the lower molecular weight material to provide a tannin extract of desirable viscosity, for example of 1500 cP or less, preferably 1200 cP or less which is especially suitable for formulation as an adhesive. The pH of the extract may be adjusted following recombination.

Separation of the high molecular weight fraction of the extract may be performed in any convenient manner. Included in the possible separation processes is ultrafiltration, for example in the manner proposed in our Australian patent specification 533791. Alternatively, the separation may be performed for example by adjusting the pH to precipitate higher molecular weight material from solution or by use of a centrifuge to remove fine particles of suspended high molecular weight material which may be of the order of 0.45 microns in size.

The high molecular weight material may have an equivalent molecular weight of from $10^5$ to $10^6$ and higher. The term "equivalent molecular weight" as used herein means the material has a molecular size equivalent to that of dextran of the stated molecular weight.

The sulphite treatment of the high molecular weight extract may be equivalent to that previously proposed for use on the full hot water extract, that is the extract containing both high and low molecular weight material.

Various sulphite compounds may be used as well known in the art, such as sulphur dioxide and sodium sulphite. Preference is given to using sodium metabisulphite. In one preferred embodiment, various extracts were adjusted to pH6 and the insoluble portions thereof collected by centrifugation and freeze-dried. A 25% aqueous suspension of the freeze-dried insolubles was then heated in a 5% solution of sodium metabisulphite for 2 hours at 100° C. under reflux conditions, although other conditions may be suitable for carrying out the sulphite treatment of the high molecular weight material. The sulphited extracts may then be dried, for example by freeze-drying.

The preferred barks for use with the first aspect of the present invention are those of radiata pine, maritime pine (*Pinus pinaster*) and caribbean pine (*Pinus caribaea*) but other products such as Quebracho wood and wattle bark may also be used.

Generally the tannin extract will be obtained from the bark and/or wood by a hot aqueous tannin extraction process. Such a process may be conventional and be carried out up to about 100° C. but the relatively low yield may still present difficulties in commerical applications.

Yield may be increased by squeezing the hot water extract from the wood/bark. It may also be advantageous to use a higher temperature, for example 105° C. or more, as this may result in an increased yield of high molecular weight tannin. Alkalis such as carbonates and hydroxides may be added to increase the pH of the aqueous solution and this has been found to improve the yield. By way of example, the pH of the aqueous extract of *Pinus radiata* bark is approximately 3.5 and alkali (eg. NaOH) may be added to increase this to about 6 which is generally the approximate pH for curing formaldehyde-condensation adhesives. It is also possible to extract the polyphenolics at up to about pH 9 to increase the yield.

Such an alkaline extraction has been proposed previously but provides inferior extract for uses including adhesive production because neutralization by mineral acids to pH 6 for the formaldehyde condensation reaction causes the formation of salts which contribute to poor adhesive performance.

It is an object of a second aspect of the present invention to provide a tannin extraction process which may result in increased yield while alleviating disadvantages associated with other such processes.

According to the second aspect of the present invention there is provided a method for obtaining tannin extract from bark and/or wood, which comprises subjecting the bark and/or wood to a first stage hot aqueous tannin extraction process, thereby obtaining a first stage tannin extract, subjecting the extracted bark and/or wood to a second stage hot aqueous extraction process at a higher pH than the first stage, thereby obtaining a second stage tannin extract, and recombining the first and second stage tannin extracts. Thus we have found that alkaline extraction may be used without seriously affecting the bonding characteristics of the extract by carrying out the extraction process in two stages, using a higher pH, for example pH 8–9 in the second stage after removing the first stage tannin extract from the extraction bath. The alkaline tannin extract is adjusted as desired by combining it with the first stage extract and may be subsequently further adjusted. Two stage extraction may increase the yield by 50–100%.

Further according to the second aspect of the present invention there is provided a tannin extract when recovered by the method described in the immediately preceding paragraph.

For the purposes of the first aspect of the present invention, the first and second stage tannin extracts may be recombined prior to separating out and sulphiting the high molecular weight material or the second stage tannin extract may comprise the high molecular weight material which is sulphited and then recombined with the first stage tannin extract. However, it is to be understood that the second aspect of the present invention may be used independently of the first aspect. Thus, for example, the second aspect of the present invention may additionally comprise separating from the recombined tannin extracts the high molecular weight material and subjecting the high molecular weight material to treatment with one or more sulphite compounds to reduce the molecular weight of said material. Accordingly, the sulphited material need not be recombined with the low molecular weight material from which the high molecular weight material is separated, although the separating and sulphiting steps may be as discussed with reference to the first aspect of the present invention.

The tannin extracts of the present invention may be particularly suited to bonding plywood in their unrecombined condition, that is where the sulphited material is used alone, and in recombined condition may be more suitable for particleboard. The extracts may also be used to advantage in bonding other reconstituted wood products such as laminated timber. It is known in the art that the assessment of bond quality of reconstituted wood products is best carried out by tests on plywood produced with the adhesive because the conditions of production can be controlled and the type of bond failure more readily assessed than for the other products.

EXAMPLES

In the Examples, in which the tannin extract was sulphited as proposed in the preferred embodiment above, the sulphited tannin extract was recombined with the remaining tannin extract to produce a tannin extract which is less prone to separation of the molecular weight species in the glueline of bonded plywood because the individual flow rates of the molecular components are more uniform, resulting in higher quality bonding. Assessment of bond performance was conducted on plywood using the standard chisel technique and showed that using the process of the Examples there is a surprising increase in bonding capability and a reduction in viscosity to levels that can be readily handled by industry—eg., viscosity of 1200 cp at total solids content of 40% and at 25° C. A further observation was that the resins produced were more tolerant of the moisture content of the veneers used in the Examples.

The following Examples illustrate the preparation of various tannin extracts in accordance with the invention and subsequent processing for use as wood adhesives. In all cases there was no selection of bark for processing.

Example 1

Tannin extract (1 part) obtained by hot (100° C.) water extraction from radiata pine (*Pinus radiata*) bark was dissolved in water (9 parts) and the pH was adjusted to pH 6 with NaOH. The soluble and insoluble portions were separated by centrifugation at 1000 g for 10 minutes and freeze-dried. The ratio of solubles to insolubles was about 3:1. The dried insolubles (25 parts), sodium metabisulphite (1.25 parts of 5% solution) and water (75 parts) were mixed and heated at 100° C. under reflux for 2 hours. The dried solubles (3 parts) and the sulphited insolubles (1 part) were recombined so that the ratio of solubles and insolubles was the same as that of the original tannin extract. The viscosity of the recombined tannin extract at 40% solids content was 1200 cP at 25° C., whereas prior to this treatment the viscosity at the same solids content and temperature was 5000 cP.

Example 2

Commercially available radiata pine (*Pinus radiata*) bark (1 part) was extracted with water (3 parts) at 100° C. for 10 minutes. This first stage extract at pH 3.5, was filtered and stored until required later for recombination with the second stage extract. In the second stage of extraction the extracted bark from the first stage extraction was further extracted in the same manner as described with reference to the first stage except that the pH of the bark was adjusted with 10% NaOH aqueous solution so that the pH of this filtered extract was approximately pH 8.5. The tannin extracts from the first and second stage extractions were combined to give a solution of pH approximately 6.8. The total yield of tannin extract was 30%. The pH of the combined extracts was adjusted to pH 6 and the insoluble portion (25% by solids of total extract) was separated by centrifugation, sulphited and recombined with the soluble portion as described in Example 1.

Example 3

Commercially available maritime pine (*Pinus pinaster*) bark was sequentially extracted with hot water and then with aqueous NaOH solution at pH 8.5 as described in Example 2. The tannin extracts from the first and second stage extractions were combined to give a solution of pH 6.2. The total yield of tannin extracts was 25% of dried bark. The insoluble portion (25%) was separated, sulphited and recombined with the soluble portion as described in Example 1.

Example 4

Commercially available carribean pine (*Pinus caribaea*) bark was extracted in the same manner as described in Example 2. The total yield of tannin extracts was 21% of dried bark. The pH of the combined tannin extracts was 6.5, this was then adjusted to pH 6. The insoluble portion (24%) was separated, sulphited and recombined with the soluble portion as described in Example 1.

Example 5

First stage (aqueous) tannin extracts from barks of (a) radiata pine (*Pinus radiata*) yield 15%, (b) maritime pine (*Pinus pinaster*) yield 14%, and (c) caribbean pine (*Pinus caribaea*) yield 11%, were obtained in the manner of Example 2 and held. The bark residues were then further extracted with alkali (pH 8.5) in the manner of Example 2 and these second stage extracts, yields 15, 10, and 10% respectively, were sulphited with sodium metabisulphite in the same manner as described in Example 1 and then combined with the respective first stage tannin extracts.

Example 6

In Examples 3, 4 and 5 the viscosities of non-sulphited extracts were greater than 5000 cP and the viscosities of recombined sulphited extracts less than 1500 cP when measured at 40% solids content and 25° C. Plywood samples were prepared by bonding coachwood (*Ceratopetalum apetalum*) veneers with the recombined extracts from Examples 1 to 5. All adhesive formulations consisted of the aqueous solution of the tannin extracts, a formaldehyde source as a condensing agent and a nut shell flour as a filler. All the formulations utilized the same tannin solids/formaldehyde source/filler ratio. No attempt was made to optimize individual adhesive formulations. Resulting plywood specimens were then tested according to Australian Standard AS 2754.1-1985 Adhesives for Plywood Manufacture. Test results for examples 1-5 are recorded in Table 2.

TABLE 2

Gluebond quality of plywood

| | | Average gluebond quality | |
|---|---|---|---|
| Examples | Bark species | Dry | Wet after 72 hours boiling |
| 1 | P.radiata | 9.0 | 9.0 |
| 2 | P.radiata | 9.5 | 7.0 |
| 3 | P.pinaster | 6.0 | 5.5 |
| 4 | P.caribaea | 6.5 | 6.5 |
| 5(a) | P.radiata | 6.5 | 6.5 |
| 5(b) | P.pinaster | 6.5 | 6.5 |
| 5(c) | P.caribaea | 8.5 | 7.0 |

The tested Examples all satisfied the requirements for type A bond adhesives (fully weather and boil proof) as classified in Australian Standards. By comparison, none of the total aqueous extracts from the same barks when sulphited under the same conditions and similarly converted to adhesives and used to produce similar plywood achieved A Bond classifications. It would be expected that the adhesive properties of some Examples could be improved by further adjustments to adhesive formulations.

We claim:

1. A method for producing a tannin extract from bark and/or wood and suitable for use in formaldehyde-condensation adhesives, said method comprising the steps of:
   (1) providing a tannin extract obtained from bark and/or wood, said tannin extract being composed of high molecular weight material and low molecular weight material,
   (2) separating from said tannin extract said high molecular weight material to leave residual low molecular weight tannin extract,
   (3) subjecting said separated high molecular weight material from step (2) to treatment with one or more sulphite compounds to reduce the molecular weight of said separated high molecular weight material from step (2), and
   (4) combining said separated, sulphited material from step (3) with said residual low molecular weight tannin extract from step (2), said combined sulphited material and said residual low molecular weight tannin extract having a viscosity of 1500 cP or less when measured at 40% solids content and at 25° C.

2. A method according to claim 1, wherein said tannin extract provided in step (1) is obtained from the bark and/or wood by a hot aqueous tannin extraction process.

3. A method according to claim 2 wherein said hot aqueous tannin extraction process comprises the steps of:
   (a) subjecting bark and/or wood to a first stage hot aqueous extraction process and removing a first stage tannin extract having a first acidic pH, and
   (b) subjecting said bark and/or wood from step (a) to a second stage hot aqueous extraction process at a second alkaline pH, thereby obtaining a second stage tannin extract.

4. A method according to claim 3 further comprising the step of:
   (c) combining said first stage tannin extract from step (a) with said second stage tannin extract from step (b).

5. A method according to claim 4, wherein said combined first stage tannin extract and second stage tannin extract from step (c) has a pH of about 6.2 to 6.8.

6. A method according to claim 3 wherein said second stage tannin extract from step (b) comprises said high molecular weight material from step (2) of claim 1 and said first stage tannin extract from step (a) comprises residual low molecular weight tannin extract from step (2) of claim 1.

7. A method according to claim 3, wherein said first acidic pH is the same as a pH of a first stage tannin extract from a mixture consisting essentially of water and bark and/or wood.

8. A method according to claim 7, wherein bark obtained from *Pinus radiata* is subjected to said hot aqueous tannin extraction process and said first acidic pH is about 3.5.

9. A method according to claim 3, wherein said second alkaline pH is from about 8 to 9.

10. A method according to claim 2, wherein said hot aqueous tannin extraction is performed at about 100° C. or more.

11. A method according to claim 1 further comprising the step of:
    (5) adjusting to about 6 the pH of said combined tannin extract from step (4).

12. A method according to claim 1, wherein said separated high molecular weight material, of step (2) has an equivalent molecular weight of no less than about $10^5$ grams per mol.

13. A method according to claim 1, wherein the viscosity of said combined sulphited material and said residual low molecular weight tannin extract from step (4) has a viscosity of no more than 1200 cP when measured at 40% solids content at 25° C.

14. A method according to claim 1, wherein step (3) comprises the steps of:
    (a) mixing separated high molecular weight material with an aqueous solution of sodium metabisulphite, and
    (b) boiling said mixture from step (a) under reflux conditions.

15. A method according to claim 1, wherein said bark and/or wood is selected from the group consisting of *Pinus radiata, Pinus pinaster,* and *Pinus caribaea*.

16. A method for recovering tannin extract from bark and/or wood comprising the steps of:
    (1) subjecting said bark and/or wood to a first stage hot aqueous tannin extraction process and removing a first stage tannin extract having a first acidic pH;
    (2) subjecting said bark and/or wood which has been subjected to said first stage extraction process of step (1) to a second stage hot aqueous extraction process at a second alkaline pH, thereby obtaining a second stage tannin extract, and
    (3) combining said first stage tannin extract from step (1) with said second stage tannin extract from step (2), said combined tannin extracts being composed of high molecular weight material and low molecular weight material wherein said second stage tannin extract contains the high molecular weight material which is treated with one or more sulfite compounds prior to being combined with said first stage extract.

17. A method according to claim 16, which further comprises:
(4) separating from said combined tannin extracts said high molecular weight material, and
(5) subjecting said high molecular weight material from step (4) to treatment with one or more sulphite compounds.

18. A method according to claim 10, wherein said separated high molecular weight material from step (4) has an equivalent molecular weight of no less than about $10^5$ grams per mol.

19. A method according to claim 16 further comprising the step of:
(4) adjusting to about 6 the pH of said combined tannin extracts of step (3).

20. A method according to claim 16, wherein said hot aqueous tannin extraction is performed at about 100° C. or more.

21. A method according to claim 16, wherein said first acidic pH is the same as a pH of a first stage tannin extract from a mixture consisting essentially of water and bark and/or wood.

22. A method according to claim 21, wherein bark obtained from *Pinus radiata* is subjected to said hot aqueous tannin extraction process and said first pH is about 3.5.

23. A method according to claim 21, wherein said second alkaline pH is from about 8 to 9.

24. A method according to claim 16, wherein said combined first stage tannin extract and second stage tannin extract from step (3) have a pH of about 6.2 to 6.8.

25. A method according to claim 21, further comprising the step of:
(4) adjusting the pH of said combined first stage tannin extract and second stage tannin extract from step (3) to about 6.

26. A method according to claim 16, wherein said bark and/or wood is selected from the group consisting of *Pinus radiata*, *Pinus pinaster*, and *Pinus caribaea*.

* * * * *